United States Patent
Wilkes

(10) Patent No.: US 8,850,073 B1
(45) Date of Patent: Sep. 30, 2014

(54) DATA MIRRORING USING BATCH BOUNDARIES

(75) Inventor: John Wilkes, Palo Alto, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 1959 days.

(21) Appl. No.: 11/742,549

(22) Filed: Apr. 30, 2007

(51) Int. Cl.
*G06F 15/16* (2006.01)
*G06F 13/00* (2006.01)

(52) U.S. Cl.
USPC .......................................... 709/248; 711/162

(58) Field of Classification Search
USPC ........... 709/238–244, 246–248; 707/200–206
See application file for complete search history.

(56) References Cited

U.S. PATENT DOCUMENTS

| | | | |
|---|---|---|---|
| 5,218,695 A * | 6/1993 | Noveck et al. ................ | 707/205 |
| 5,259,006 A * | 11/1993 | Price et al. .................... | 375/356 |
| 5,673,382 A | 9/1997 | Cannon et al. | |
| 5,742,792 A | 4/1998 | Yanai et al. | |
| 5,832,522 A | 11/1998 | Blickenstaff et al. | |
| 5,889,935 A | 3/1999 | Ofek et al. | |
| 5,901,327 A | 5/1999 | Ofek | |
| 6,044,444 A | 3/2000 | Ofek | |
| 6,052,797 A | 4/2000 | Ofek et al. | |
| 6,148,383 A * | 11/2000 | Micka et al. .................. | 711/162 |
| 6,148,412 A | 11/2000 | Cannon et al. | |
| 7,013,379 B1 | 3/2006 | Testardi | |
| 7,165,187 B2 | 1/2007 | Ji et al. | |
| 7,181,582 B2 | 2/2007 | Cochran | |
| 2004/0049634 A1 | 3/2004 | Cochran | |
| 2005/0066239 A1 | 3/2005 | Keeton et al. | |
| 2005/0160315 A1 | 7/2005 | Chandrasekaran et al. | |
| 2006/0112219 A1 | 5/2006 | Chawla et al. | |
| 2006/0123212 A1 | 6/2006 | Yagawa | |
| 2006/0136685 A1 | 6/2006 | Griv et al. | |
| 2006/0179061 A1 | 8/2006 | D'Souza et al. | |
| 2006/0184587 A1 | 8/2006 | Federwisch et al. | |
| 2006/0193252 A1 | 8/2006 | Naseh et al. | |
| 2006/0262759 A1 * | 11/2006 | Bahl et al. ...................... | 370/338 |

OTHER PUBLICATIONS ("Timeout", Hyperdictionary.com, Copyright 2000-2009, Dec. 1, 2009).*
Minwen Ji, Alistair Veitch, John Wilkes, "Seneca: remote mirroring done write", Proceedings of USENIX Technical Conference (San Antonio, TX), pp. 253-268, Jun. 2003. USENIX, Berkeley, CA.
Dü,llmann, D. and Segal, B. 2001. Models for Replica Synchronisation and Consistency in a Data Grid. In Proceedings of the 10th IEEE international Symposium on High Performance Distributed Computing (Aug. 7-9, 2001). High Performance Distributed Computing. IEEE Computer Society, Washington, DC, 67.

(Continued)

*Primary Examiner* — Afshawn Towfighi

(57) ABSTRACT

Provided are, among other things, systems, methods and techniques for controlling data synchronization. Local data-writing operations, made across a number of logical storage units on different data-storage devices, are divided into batches, the batches corresponding to different time segments. The data-writing operations, together with an indication of boundaries between the batches, are transmitted to a remote data-storage location. The boundaries between the batches are determined by at least one of: (1) identifying a period of time of sufficient duration during which no data-writing operations were performed and declaring a point during said period of time as one of the boundaries, (2) obtaining agreement from a plurality of entities, and (3) declaring the boundaries at pre-scheduled points in time.

22 Claims, 5 Drawing Sheets

(56) References Cited

OTHER PUBLICATIONS

"Network Appliance™ SnapMirror® Software", 2006 Network Appliance, Inc.

"Using Asynchronous Replication for Business Continuity between Two or More Sites—A technical white paper", EMC Corporation, Dec. 2004.

Norm MacNeil and Patti Gardner, "Hitachi Thunder 9500™ V Series Remote Replication Methods—An Application Brief", Hitachi Data Systems Corporation, Aug. 2005.

Christophe Bertrand, Bill Martin, Roselinda Schulman, and Claus Mikkelsen, "Hitachi Universal Replicator Software Architecture Overview—A White Paper", Hitachi Data Systems Corporation, Mar. 2007.

Christophe Bertrand, Tom Attanese, Roselinda Schulman, and Claus Mikkelsen, "Hitachi Universal Replicator Advanced Technology—A White Paper", Hitachi Data Systems Corporation, Sep. 2004.

www.powells.com—Powell's Books, Synopses & Reviews, Distributed Algorithms (96 Edition) by Nancy Lynch, dated Sep. 8, 2009 (4 pages).

Randomized Protocols for Asynchronous Consensus, James Aspnes, Sep. 5, 2002 (29 pages).

\* cited by examiner

DATA MIRRORING USING BATCH BOUNDARIES

FIELD OF THE INVENTION

The present invention pertains to systems, methods and techniques for data mirroring and is applicable, e.g., to off-site mirroring of data for disaster-recovery purposes.

BACKGROUND

Data mirroring is a technique for tolerating failures. By keeping two or more copies of important information, access can continue if one of them is lost or becomes unreachable. Data mirroring can be used inside disk arrays, (commonly referred to as a redundant array of independent disks, or RAID); between disks or disk arrays; and/or across multiple sites (commonly referred to as remote mirroring).

Unfortunately, the design choices for remote mirroring are complicated by competing goals, e.g., keeping the copies as closely synchronized as possible, delaying local (foreground) writes as little as possible, maintaining accessibility in the event of a failure (across as many different failure types as possible), and using as little inter-site network bandwidth (which typically is fairly expensive) as possible.

The most common trade-off is between good performance at low cost against the amount of potential data loss, especially for recently-written data. Simple solutions, such as synchronously updating all copies, can provide good resilience to data loss, but have poor local write performance and incur high network costs in remote-mirroring systems. Accordingly, synchronous mirroring typically is reserved for short-distance mirroring, while asynchronous mirroring is used for long-distance off-site mirroring, especially where the off-site facility is a significant distance away from the operational site. Asynchronous mirroring is particularly preferred where the two facilities are many miles apart, which is often desirable to protect data from the possibility of a large-scale disaster or problem.

DESCRIPTION OF THE PREFERRED EMBODIMENT(S)

Figure 1:
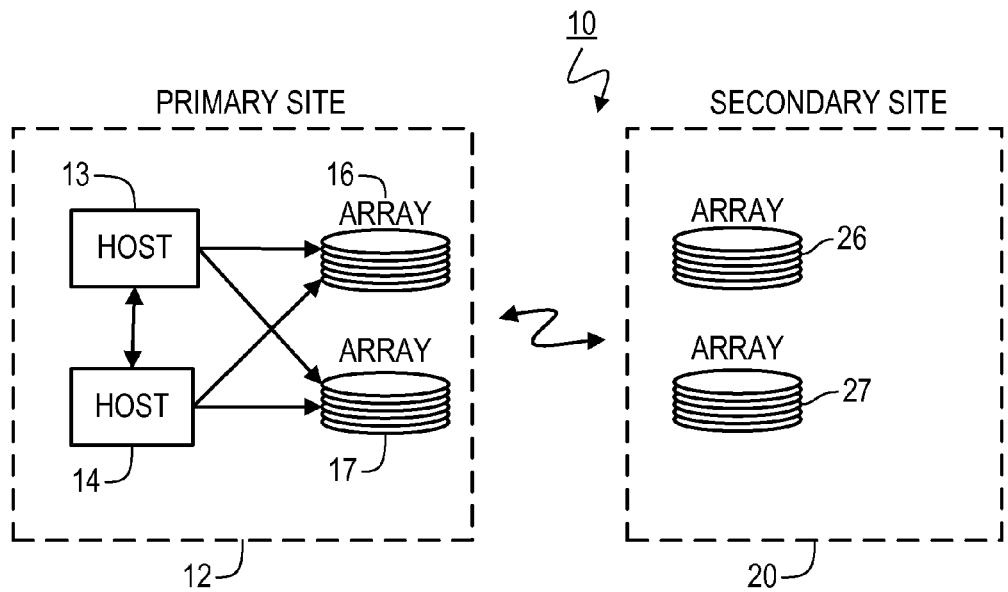
FIG. 1 is a block diagram illustrating an overall system for remote data mirroring according to representative embodiment of the present invention.

FIG. 1 is a block diagram illustrating an overall system 10 for remote data mirroring according to representative embodiment of the present invention. In this configuration, a primary site 12 conducts operations in the normal course of business, while the remote secondary site 20 primarily serves as a backup facility for the purpose of maintaining a sufficiently current copy of the operational data maintained at primary site 12.

In this regard, primary site 12 performs its operations by executing one or more application programs across multiple host computers, such as host computers 13 and 14 shown in FIG. 1. The host computers 13 and 14 store data into and retrieve data from multiple disk arrays, such as disk arrays 16 and 17 shown in FIG. 1. Periodically, primary site 12 communicates with secondary site 20, providing copies of data-write operations that have been made to disk arrays 16 and 17 so that similar write operations can be performed at secondary site 20, i.e., so that corresponding disk arrays 26 and 27 at secondary site 20 will maintain a copy of the data stored in disk arrays 16 and 17. It is noted that although the term "disk array" is used frequently throughout this discussion, such usage is exemplary only and, generally speaking, refers to any data-storage device that operates as a unit, e.g., under a single controller.

Assuming that it is impractical to use synchronous mirroring, the copy of the data that the secondary site 20 necessarily will exhibit some amount of time lag with respect to the copy at the primary site 12. That is, the current copy of the data located at secondary site 20 always will reflect the copy of the data at primary site 12 that existed at some previous point in time. Some of the trade-offs mentioned above are reflected in the amount of such time lag that will be tolerated.

Another significant additional consideration is data consistency. That is, the secondary site 20 always should be able to reproduce a state that corresponds to a state that existed at the primary site 12 (albeit with some time lag). If, for example, some of the data-write operations that were performed at the primary site 12 subsequently are applied at the secondary site 20 in a different order, it is possible that the entire dataset at secondary site 20 will be corrupt and unusable (i.e., not just the data that were applied out of sequence, but potentially all of the data at secondary site 20).

An objective of certain embodiments of the present invention is to provide remote-data-mirroring techniques that make it possible to achieve a consistent state at the remote site 20 after something has gone wrong. For example, it might be problems with one or more of the local host(s) 13 and 14, the local data-storage devices (such as either or both of disk arrays 16 and 17) or a link between sites. Another objective is to accomplish the foregoing benefits with increased efficiency, and without materially slowing down the normal operation of the primary operational system.

One potential obstacle to accomplishing these objectives is the complexity of the configuration at primary site 12. Although FIG. 1 illustrates a primary site 12 that has just two host computers 13 and 14 and two disk arrays 16 and 17, this configuration should be understood as exemplary only. In many practical implementations, there will be additional host computers and additional disk arrays, potentially all communicating with each other.

Figure 2:
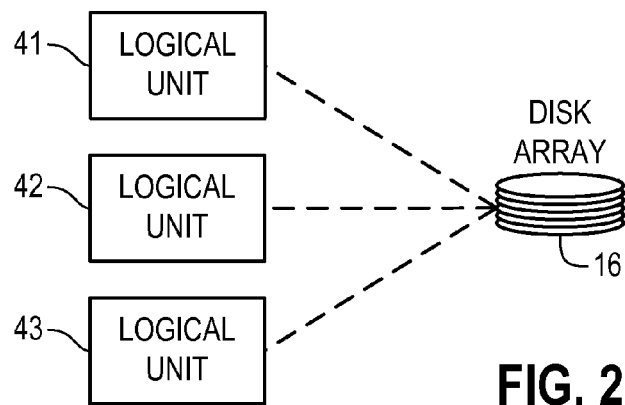
FIG. 2 is a block diagram illustrating a single disk array providing multiple logical storage units according to a representative embodiment of the present invention.

Moreover, as shown in FIG. 2, a single disk array (taking disk array 16 as an example) can provide multiple logical units (LUs) 41-43, sometimes alternately referred to herein as logical storage units. Generally speaking, each LU appears to a user and/or an application program as a distinct storage disk. Although only three LUs are illustrated in FIG. 2, a single disk array can in fact provide thousands of LUs. LU granularity allows different kinds of data to be provided with different kinds and degrees of protection. For example, a user file system might need less protection than a database index, which probably will need less protection than the data being indexed.

Figure 3:
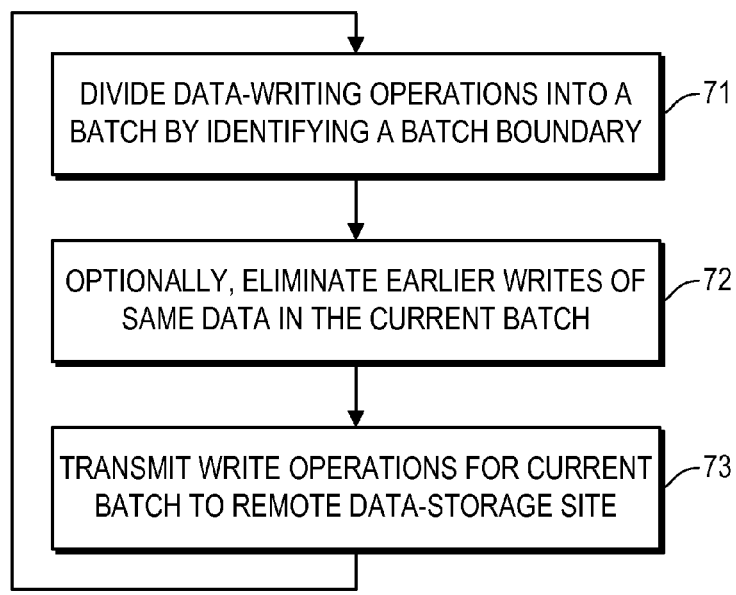
FIG. 3 is a flow diagram illustrating an overall approach to data mirroring according to certain representative embodiments of the present invention.

The overall approach of the preferred embodiments of the present invention is now described with reference to FIG. 3. The process shown in FIG. 3 ordinarily is executed at the primary site 12, e.g., entirely in software and in parallel with the ordinary operations being performed at primary site 12.

In step 71, the local data-writing operations (e.g., for data writes into disk arrays 16 and 17) are divided into batches, each batch corresponding to a different time segment. In the preferred embodiments, the maximum duration of the time segment (which can be a hard or soft maximum) is specified based on how current the copy at the remote site 20 ideally should be. This system parameter generally is determined in advance by trading off the value of a more current copy at the remote site 20 against the additional cost associated with increased data currency. Typically, batches are scheduled for anywhere from every 30 seconds to every couple of hours or even every day, again depending upon how critical the data are. It is noted that in addition to such incremental data updates, there often will be periodic full data updates in which a complete set of all of the data in the relevant databases within disk arrays 16 and 17 at the primary site 12 are transferred over to the secondary site 20; however, only the incremental updates are addressed herein.

In most of the preferred embodiments, this step 71 is performed by specifying batch boundaries in real-time, with each batch boundary (or barrier) defining the end of one batch and the beginning of the next. Accordingly, the focus of this step 71 in the preferred embodiments of the invention is to identify a point at which to declare the current batch boundary. More detail regarding different approaches to determining where to place a batch boundary according to the various embodiments of the invention is described below. However, the general goal of this step 71 is to place the batch boundary at a point in time that is least likely to interfere with the efficiency of the ordinary operations of primary site 12, while at the same time ensuring that a consistent copy will be provided at the secondary site 20. To achieve this goal, the present invention generally attempts to obtain agreement among all relevant entities, again as described in more detail below.

Optional step 72 is directed toward increasing efficiency in the transmission of the batch data by eliminating unnecessary data-write operations that occurred during the time segment corresponding to the current batch. As noted above, the current batch corresponds to the time period ending with the batch boundary that was just declared in step 71 and beginning with the immediately preceding batch boundary.

In order to fully understand the processing performed in this step 72, some background information is helpful. Each batch of data-write operations that have been performed at the primary site 12 is intended to be applied atomically at the secondary site 20, i.e., applied in its entirety at the secondary site 20, or not at all. Application of only a portion of a batch generally is not guaranteed to result in any state that is consistent with any identifiable previous state of the primary site 12. The application of each new batch at the secondary site 20 advances the state of the secondary site 20 to the next subsequent point in time at which its state can be known to match the corresponding (although somewhat earlier, due to the inherent time lag) state of the primary site 12 (assuming no data errors during transmission of the batch).

Because batches are intended to be applied atomically, only the net effect of all data-write operations that occurred at the primary site 12 during the time segment corresponding to the current batch matters. Accordingly, individual data-write operations that do not affect the final state can be eliminated, and preferably are eliminated if there are expected to be net savings in terms of the reduction in the amount of data to be transmitted as compared to the processing costs. For example, if data are written into a data block at one point during the current batch and then are overwritten or marked for deletion later during the same batch, the earlier data-write operation can be eliminated from the batch. It is noted that, in addition to eliminating individual data-write operations, performing this step 72 can eliminate the need to timestamp or otherwise order each individual data-write operation that is transmitted to secondary site 20 as part of the same batch, thereby potentially further reducing the data-transmission requirements. In addition, or instead, in certain embodiments of the invention, compression is performed after the batch level; generally speaking, better compression can be achieved using larger segments.

In step 73, the remaining data-write operations for the current batch are transmitted to the remote data-storage site 20. In the preferred embodiments, each batch is sent separately (the earlier one must be completed before the next one is started). In addition, it generally is preferable to include a timestamp for the batch as a whole. In alternate embodiments, it is possible to transmit different batches at the same time. However, in either event an indication of boundaries between the batches (whether explicit or implicit) preferably is transmitted in order to permit the secondary site 20 to apply the batches atomically.

Upon completion of step 73, processing returns to step 71 in order to define the next batch boundary. In this way, a continuous string of batches, representing successive time intervals, are defined by the primary site 12 and transmitted to the secondary site 20 for application there. The result is a sequence of points at which the secondary site 20 has a mirror copy of the data in the primary site 12 (although delayed somewhat in time due to the inherent time lag of the process).

Figure 4:
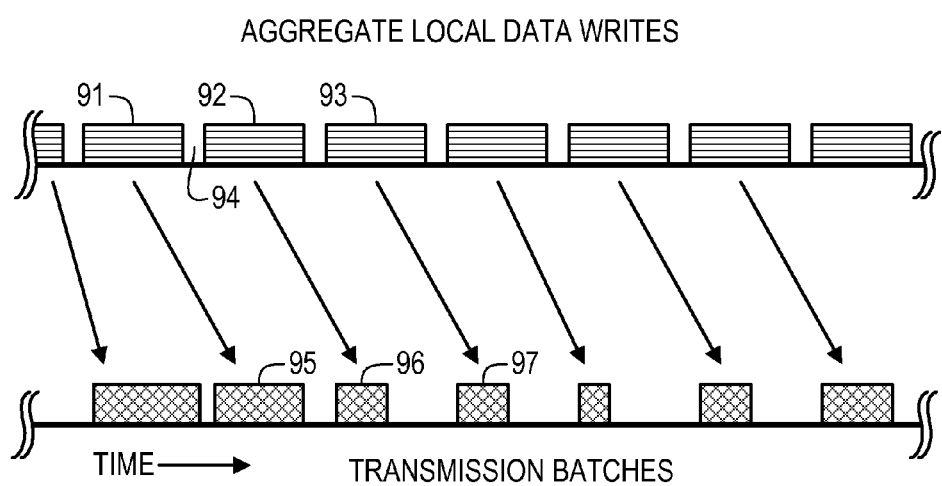
FIG. 4 illustrates a timeline showing the generation of data-write batches according to a representative embodiment of the present invention.

FIG. 4 illustrates a sample timeline showing the generation of data-write batches according to a representative embodiment of the present invention. Each of the blocks 91-93 indicates a period of time covered by a single batch. That is, each of blocks 91-93 represents the aggregate of all data-write operations potentially performed by multiple host computers 13 and 14 to multiple LUs 41-43 across multiple disk arrays 16 and 17. In the present embodiment, the batches correspond to fixed-length of time intervals. However, in many embodiments that will not be the case, as discussed in more detail below.

Between each pair of adjacent batches (e.g., batches 91-93) is a gap (e.g., gap 94). Within that gap is the defined batch boundary, typically at the center of the gap. As discussed in more detail below, the reason for the gap is that the various entities that are coordinating the definition of the batch boundaries typically will have different clocks. The gaps provide a margin to accommodate the maximum expected clock skew. In order to ensure consistency, no data-write operations are permitted to occur during any portion of the gaps.

Upon completion of each batch at the primary site 12, i.e., the designation of each new batch boundary, the corresponding batch is transmitted to the secondary site 20. Thus, batches 95-97 are transmitted for time intervals 91-93, respectively. The size of each of the batches 95-97 depends upon both the quantity of data-write operations that occurred during the corresponding one of the time intervals 91-93 and the quantity of such data-write operations, if any, that have been discarded in step 72.

Some of the efficiencies of transmitting data-write operations in batches, in terms of reducing the amount of data that need to be transmitted to the secondary site 20, have been described above. However, the difficulty of coordinating the various relevant entities in order to properly define batches also has been discussed. Many of the conventional techniques for asynchronous data mirroring involve a single disk array or a single host computer and therefore do not address the more complicated configuration discussed above. The conventional techniques that do address such complicated configurations generally use a structure in which a single entity has absolute control in real time over where batch boundaries are declared (sometimes referred to herein as a command-and-control structure), e.g., in which all local data-write operations simply are suspended when it is desired to declare a batch boundary. Unfortunately, such approaches usually result in a drastic reduction in throughput and efficiency at the primary site 12.

The preferred techniques of the present invention avoid any such real-time absolute control over the applicable entities. Instead, to the extent coordination is required, the present invention generally relies upon mutual agreement of autonomous (e.g., primarily operating according to an independent instruction set) or partially autonomous (e.g., operating independently at least with respect to some data-writing operations) agents involved.

Figure 5:
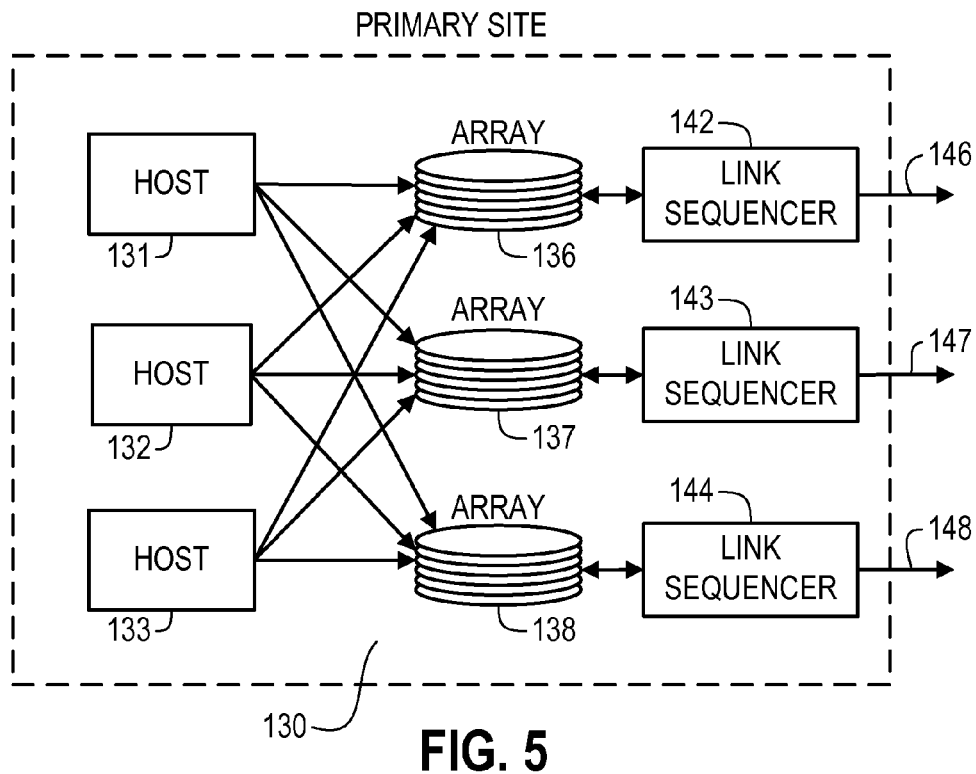
FIG. 5 illustrates a block diagram of a second exemplary primary site according to a representative embodiment of the present invention.

FIG. 5 illustrates a block diagram of a more detailed and more complex primary site 130, e.g., including three host computers 131-133, each writing to each of three different disk arrays 136-138. In addition, each of the disk arrays 136-138 has an associated link sequencer 142-144 that controls the data that are transmitted to the remote site (not shown) on a corresponding link 146-148. Once again, the number of host computers, disk arrays and link sequencers is exemplary only, and any other number may be included. Similarly, although it frequently will be the case that each disk array 136-138 has its own separate link sequencer 142-144 and corresponding link 146-148, in certain embodiments of the invention there are fewer links and link sequencers than disk arrays.

In the various different embodiments of the invention, to the extent that agreement is desired among the relevant group of more or less autonomous agents, that agreement can be obtained from all of the host computers 131-133 (typically, the operating system for each host computer), all of the disk arrays 136-138 (typically, the controller for each disk array) or all of the link sequencers 142-144.

In the preferred embodiments, the system 130 is designed to minimize the number of entities from which consent is to be obtained. Therefore, if there are fewer disk arrays than host computers, then all other considerations being equal, the system preferably is designed to obtain consent from the disk arrays.

In other words, a batch boundary generator need only contact sufficient entities in order to get agreement that a boundary will be inserted in the request stream across all transmission points to the secondary site 20. That is, if there are, for example, two links (each with a link sequencer that determines what gets sent across the link, in what order), three disk arrays, and five hosts, then the necessary quorum for a barrier is just those entities that can enforce ordering across the transmission links. In practice, the number of link sequencers is likely to be equal to the number of disk arrays (assuming links are connected to arrays), and a host may reach consensus by talking just to the three disk arrays.

For the purpose of determining the set of relevant entities from which consent is obtained, the preferred embodiments of the invention divide a set of peer entities into consistency groups, i.e., groups of entities (such as LUs) that operate or are used completely independently from their peers. Then, consent preferably is obtained only from those entities within the same consistency group. Any of the conventional techniques can be used for identifying the consistency groups.

Preferably, all local data-write requests at primary site 130 are timestamped, either as they leave the hosts 131-133, or as they arrive at the disk arrays 136-138. That timestamp then is used for ordering the data-write operations, for the purpose of removing unnecessary data-write operations in step 72 (as discussed above) and/or for application to the storage devices (e.g., disk arrays 26 and 27) at the remote site 20. In order for the timestamps to have value, in the event they were generated by different hosts or different storage devices, they preferably are made "consistent" with each other. To do this, the timestamp generators preferably maintain synchronized (e.g., relatively loosely synchronized) clocks. Such synchronization generally is possible to within a fraction of a millisecond on a local area network (LAN), and to within a few milliseconds on a wide area network (WAN).

Figure 6:
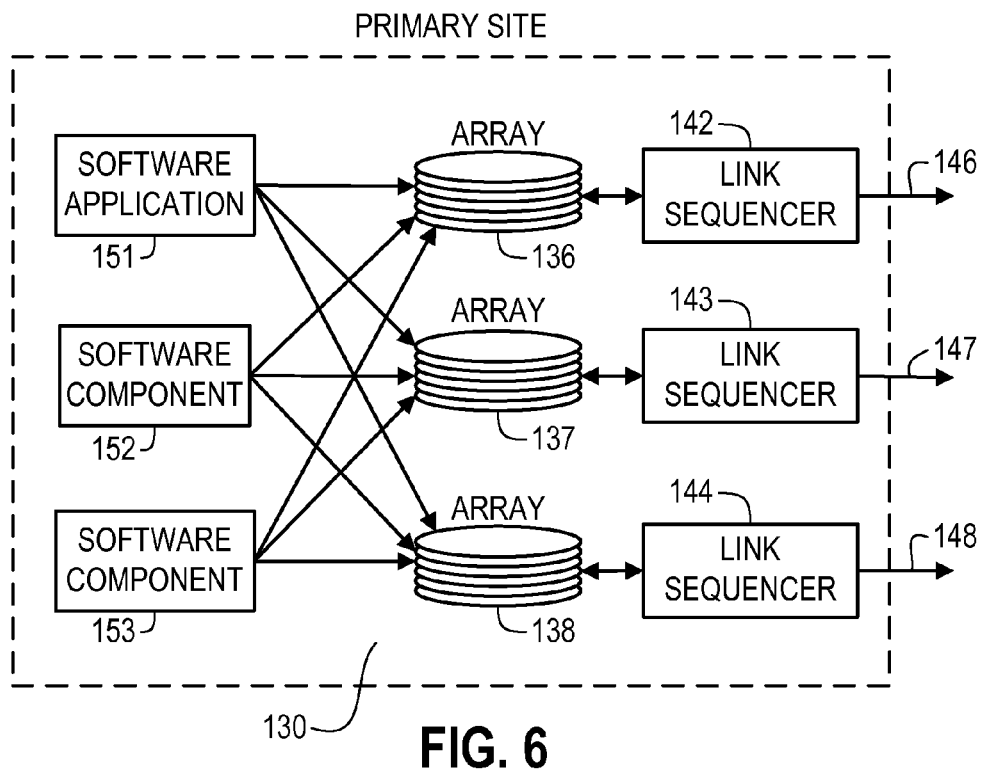
FIG. 6 illustrates a block diagram showing an alternate view of the second exemplary primary site according to a representative embodiment of the present invention.

Another way to visualize the primary site 130 is shown in FIG. 6. As shown, one or more software applications 151 or components 152-153 of one or more software applications (e.g. components of a single software application executing across multiple hosts) control the data-write operations to various LUs provided by the disk arrays 136-138. In certain embodiments of the invention, particularly if such components or applications are few enough, consent may be obtained from them (instead of the hosts, disk arrays or link sequencers) for the purpose of declaring a batch boundary.

The present invention provides a variety of different but related techniques for avoiding the use of a real-time command-and-control structure and for achieving the objectives outlined above. In the various embodiments of the invention, individual ones or various combinations of these techniques are used, e.g., as described in some of the examples below.

Figure 7:
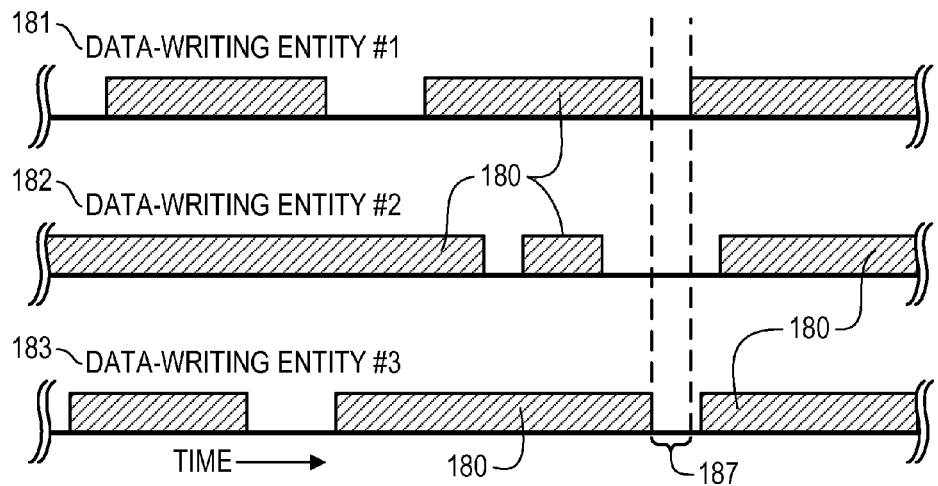
FIG. 7 illustrates a timeline showing a hindsight approach for declaring batch boundaries according to a representative embodiment of the present invention.

The first technique, illustrated in FIG. 7, essentially is an opportunistic or hindsight approach. An entity that is responsible for declaring a batch boundary (e.g., one of the link sequencers 142-144) monitors the data-write operations 180 of a number of data-writing entities 181-183 (which could be any of, e.g., hosts 131-133, disk arrays 136-138 or software agents 151-153). When a gap 187 in the data-write operations 180 is discovered across all data-writing entities 181-183, and the gap 187 is of sufficient duration to accommodate the maximum expected clock skew, then a potential batch boundary is declared within the gap 187. If only a single entity is responsible for declaring batch boundaries (e.g., a single link sequencer exists), then the potential batch boundary is declared an actual batch boundary. In a somewhat alternate embodiment, the secondary site 20 receives a continuous stream of data writes 180 from the primary site 12, waits for a sufficient gap 187 in the data-writing operations 180, and then declares a batch boundary within that gap 187.

However, if multiple entities are responsible for declaring batch boundaries, then an agreement preferably is reached among all such entities before an actual batch boundary is declared. This situation might arise, e.g., where multiple link sequencers 142-144 are monitoring data-write operations for different disk arrays 136-138, respectively. In such a case, agreement generally would not simply involve coordination among the link sequencers 142-144, but generally also would involve ensuring that there were no data-write operations, as monitored by each of the link sequencers 142-144, during the relevant time period 187. Because the link sequencers 142-144 themselves do not control local data-write operations, they generally are limited to monitoring and agreeing on an appropriate batch boundary based on historical data-write operations, i.e., local data-write operations that have already been performed by the data-writing entities.

Figure 8:
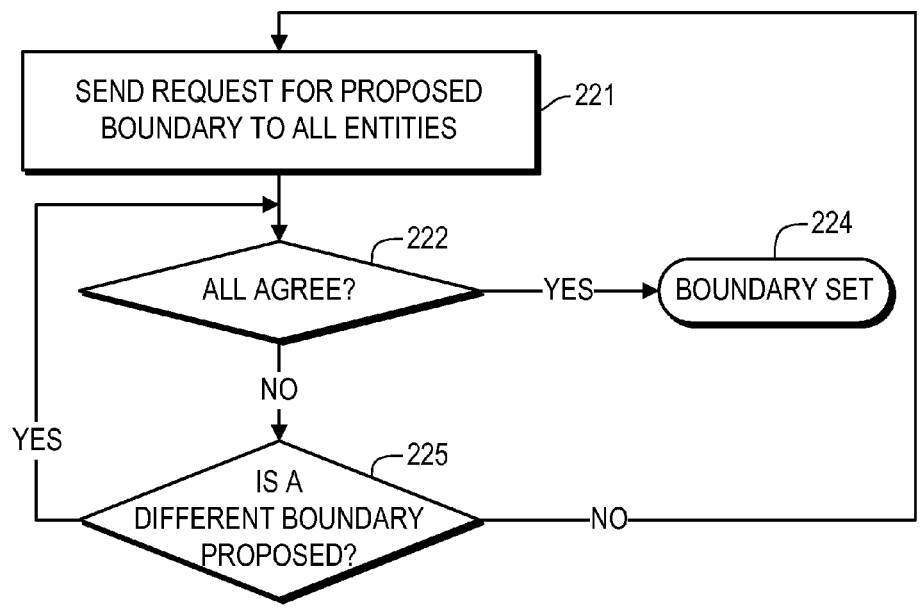
FIG. 8 is a flow diagram showing a distributed-agreement process according to a representative embodiment of the present invention.

In order to achieve agreement among multiple autonomous or semi-autonomous agents, a distributed-agreement approach preferably is used. An example is now described with reference to FIG. 8.

In step 221, one of the entities responsible for declaring batch boundaries (whether a host, storage device, application, application component or link sequencer) sends (e.g., using broadcast or multi-cast) a message to its peers requesting a batch boundary at a particular point in time.

Alternatively, or in addition, a separate entity (e.g., a dedicated application or special-purpose processor) is used for monitoring and then requesting batch boundaries. These alternate embodiments essentially offload most or all of the administrative work involved in monitoring and/or suggesting batch boundaries to such a separate entity. As a result, e.g., the entities whose consent is required merely respond to requests for batch boundaries and, where applicable, propose more acceptable boundaries. In certain sub-embodiments, the separate entity monitors historical data-writing operations and attempts to declare a batch boundary within a gap of appropriate duration; however, after a specified period of time has elapsed since the last batch boundary was declared, it preferably requests a batch boundary, potentially with an indication as to how soon a batch boundary should be declared based on the maximum specified time lag between the copy of the data at the secondary site 20 and the copy of the data at the primary site 12. In addition, or instead, in certain embodiments of the invention the secondary site 20 has the ability to propose a batch boundary, e.g., in the same manner described above with respect to a separate entity at the primary site 12.

Each of the entities responsible for consenting to batch boundaries responds, and in step 222 a determination is made as to whether all of the peers agree. If so, then the batch boundary is declared in step 224 and processing halts until another request is issued in the next invocation of step 221. If not, then processing proceeds to step 225.

In step 225, a determination is made as to whether one of the entities responsible for declaring batch boundaries has sent a request for a different proposed boundary. For example, such a request might be sent if one of the peers which is a data-writing entity anticipates that its current data-write operation will not be completed by then or because it is in the process of, or has in its queue, one or more high-priority data-write operations. If such a request has been sent, then processing returns to step 222 to determine if all of the peers agree. If not, then processing returns to step 221 to await the next request for a batch boundary.

It is noted that any of a variety of different distributed-agreement algorithms may be used in order to obtain agreement among the various relevant peers as to where a batch boundary should be placed. Examples of distributed-agreement algorithms are discussed in Nancy A Lynch, "Distributed Algorithms" Morgan Kaufmann, 1996, ISBN 1558603484; and James Aspnes, "Randomized protocols for asynchronous consensus", Distributed Computing vol. 16, pp. 165-175, September 2003.

Figure 9:
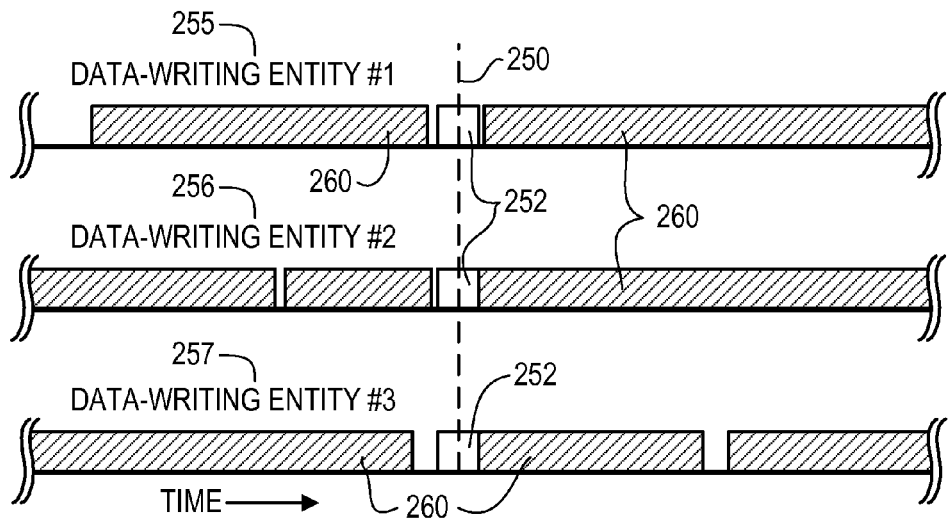
FIG. 9 illustrates a timeline showing agreement among three data-writing entities to a proposed batch boundary according to a representative embodiment of the present invention.

Specific examples in which agreement is obtained are now discussed with reference to FIG. 9. Here, a batch boundary 250 has been proposed to each of three different data-writing entities 255-257 (e.g., hosts 131-133, disk arrays 136-138 or software agents 151-153). The proposer could have been another data-writing entity or a separate entity, such as a link sequencer 142-144. Alternatively, all of the data-writing entities could have agreed in advance that there would be batch boundaries at particular points in time (e.g., at regular fixed time intervals). In any event, agreement has been reached, meaning that each of the data-writing entities 255-257 ceases its data-writing activities 260 within a window 252 before and after the agreed-upon batch boundary 250. Once again, the size of the window 252 is set based upon the maximum expected clock skew (e.g., at least twice the maximum expected skew).

Figure 10:
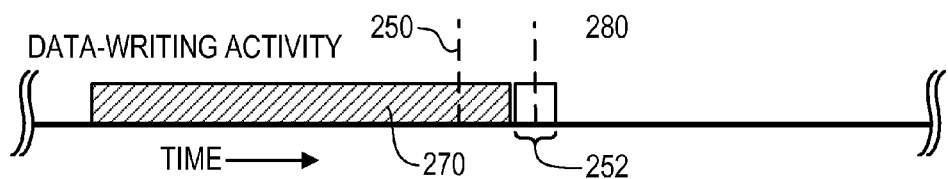
FIG. 10 illustrates a timeline showing a situation in which, in response to a proposed boundary which would occur during a data-writing operation, a different boundary is proposed, according to a representative embodiment of the present invention.
Figure 11:
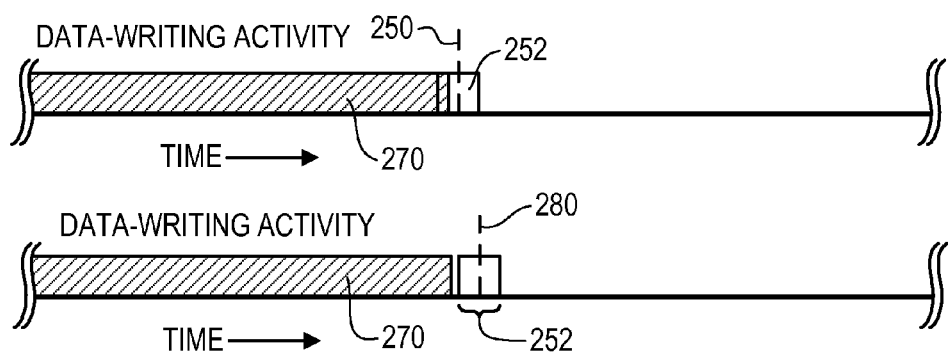
FIG. 11 illustrates a timeline showing a situation in which, in response to a proposed boundary whose buffer window would occur during a data-writing operation, a different boundary is proposed, according to a representative embodiment of the present invention.

FIG. 10 illustrates a situation in which one of the data-writing entities does not agree to the proposed batch boundary 250, e.g., because it is not able to, or it would not be practical or efficient to, suspend its data-write operations at the point in time corresponding to the proposed batch boundary 250. Similarly, FIG. 11 illustrates a situation in which the data-writing operations will not necessarily overlap the proposed batch boundary 250, but are expected to possibly conclude within the margin 252. In both cases, the data-writing entity proposes a new batch boundary 280 that follows the conclusion of its designated data-writing operations by at least the minimum required margin 252.

A number of different but related techniques have been described above. These techniques can be used individually in a given embodiment, or embodiments can combine various ones of these techniques, as desired. For example, the hindsight approach discussed above generally is the least intrusive technique, as well as the one least likely to affect local efficiency, because it does not interfere at all with local data-writing operations. Accordingly, in one embodiment of the invention, the hindsight technique is attempted first, but if no quiet period of sufficient duration is identified and a sufficient amount of time has passed since the last batch boundary (e.g., relative to the specified maximum tolerable delay), then a request may be sent to a relevant group of data-writing entities. At this second stage, the likelihood of agreement is increased, particularly if the individual data-writing entities are willing to hold off their data-writing activities (or at least the non-critical ones) within the required margin around the proposed batch boundary. Moreover, by proposing the batch boundary sufficiently far into the future, the data-writing entities sometimes will be able to schedule their data-writing activities so as to minimize the impact on overall efficiency (e.g., based on estimates of completion time for jobs in their queue and by executing only shorter jobs immediately prior to the required silent period 252).

As noted above, the data-writing entities can agree in advance that batch boundaries will occur at pre-specified times (e.g., at fixed time intervals). Such an agreement provides a long lead time and the associated benefits described above. In addition, in certain embodiments the individual data-writing entities have the ability to send a request that a particular pre-scheduled batch boundary be modified, e.g., if the interests of efficiency indicate that such a modification would be desirable as the pre-scheduled batch boundary approaches.

The present invention also encompasses techniques using multiple different time periods for requesting batch boundaries. For example, an entity might initially send a request for a batch boundary to occur "now" or in a very short period of time. Then, if it cannot obtain agreement, it might send a request for a batch boundary to occur further out into the future, thereby increasing the likelihood that the relevant entities will agree.

In the embodiments described above, it generally is assumed that the initial batch-boundary proposal is provided by an entity within the primary site (e.g., primary site 12 or 130). However, in certain embodiments the proposal is provided by the secondary site 20. In such "pull-based" techniques, the secondary site 20 might request a current or past point in time, in which case the hindsight approach (discussed above) preferably is used to find a quiet period around the requested point in time. Alternatively, the secondary site 20 might request a future point in time, in which case any of the other agreement-based techniques discussed above preferably is used.

The agreement mechanisms and/or hindsight approaches of the present invention, as described above, thus take into account the individual circumstances of various autonomous agents within the overall system. As a result, the present invention often is able to achieve greater efficiency than is possible with conventional approaches.

In the discussion above, it generally is assumed that there is a single primary site (e.g., primary site 12 or 130) and a single secondary site (e.g., secondary site 20). As used herein, the primary site refers to a single logical site, which might in fact comprise multiple geographically distinct sites. If multiple logical primary sites exist, then the techniques described above can be applied independently to each. In the event that there are multiple secondary sites, the sites can be functioning as a single logical site, collectively storing a single copy of the data at the primary site, or else can be functioning as multiple logical sites, each storing its own copy of the data at the primary site.

The present invention primarily focuses on the processing performed at the primary site 12 or 130. As noted above, the secondary site 20 applies the received batches atomically. This can be done, e.g., in either of the following two ways:
1. Pessimistic: the writes for a batch are accumulated at the secondary site 20 until the entire batch has arrived. Once all secondary sites have agreed that they have a complete copy of the current batch, the batch is applied to the secondary copies.
2. Optimistic: writes are applied, but the data that are being overwritten are copied first. This can be done by making explicit copies, or by using a copy-on-write snapshot, or sequence of snapshots. In either case, one refinement is that multiple writes to the same destination need only save a single copy of the overwritten data for each batch. If the write subsequently is to be undone, the previously copied data are simply re-applied.

System Environment.

Generally speaking, except where clearly indicated otherwise, all of the systems, methods and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial or parallel port, SCSI (small computer system interface), parallel-attached SCSI, FibreChannel, Ethernet, serial ATA, USB or firewire connection, or using a wireless protocol, such as Bluetooth or a 802.11 protocol); software and circuitry for connecting to one or more networks (e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system), which networks, in turn, in many embodiments of the invention, connect to the Internet or to any other networks); a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM. However, in some cases the process steps initially are stored in RAM or ROM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored program instructions for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memory devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device.

The foregoing description primarily emphasizes electronic computers and devices. However, it should be understood that any other computing or other type of device instead may be used, such as a device utilizing any combination of electronic, optical, biological and chemical processing.

Additional Considerations.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of data synchronization, comprising:
dividing, by at least one computer, data-writing operations, made across a plurality of logical storage units on different data-storage devices, into batches, the batches corresponding to different time segments; and
transmitting, by the at least one computer, a plurality of the data-writing operations, together with an indication of boundaries between the batches, to a remote data-storage location,
wherein a particular one of the boundaries between the batches is determined by at least one of: (1) identifying a period of time of sufficient duration during which no data-writing operations were performed and declaring a point during said period of time as the particular boundary, wherein identifying the period of time having the sufficient duration is to accommodate a maximum expected clock skew among a plurality of entities, and (2) obtaining agreement from the plurality of entities, wherein obtaining the agreement comprises at least some of the plurality of entities receiving a request proposing the particular boundary and the at least some of the plurality of entities responding whether or not the at least some of the plurality of entities agree with the proposed particular boundary.

2. A method according to claim 1, wherein the particular boundary is determined by obtaining the agreement from the plurality of entities, using a distributed agreement algorithm across the plurality of entities to obtain agreement from the entities in real-time.

3. A method according to claim 2, wherein in response to the request proposing the particular boundary, the at least some of the plurality of entities respond by proposing a boundary different from the particular boundary.

4. A method according to claim 2, wherein the plurality of entities comprise different data-storage device controllers.

5. A method according to claim 2, wherein the at least one computer includes plural computers, and wherein the plurality of entities comprise different ones of the plural computers.

6. A method according to claim 2, wherein the plurality of entities comprise different portions of a software program running on the at least one computer.

7. A method according to claim 1, further comprising determining that a same data block was written in an earlier first data-writing operation and in a later second data-writing operation within a same batch and, in response, suppressing transmission of the first data-writing operation.

8. A method according to claim 1, wherein data-writing operations for earlier batches are transmitted before data-writing operations for later batches.

9. The method according to claim 1, wherein the at least one computer includes plural computers, and wherein the plurality of entities comprise different ones of the plural computers, and
wherein the plural computers use different clocks, and wherein identifying the period of time having the sufficient duration comprises identifying a time gap that provides a margin to accommodate clock skew resulting from use of the different clocks.

10. A method according to claim 1, wherein the particular boundary is determined by:
identifying the period of time of sufficient duration during which no data-writing operations were performed and declaring the point during said period of time as the particular boundary; and
obtaining the agreement from the plurality of entities regarding the declared particular boundary,
wherein the declared particular boundary is used if the plurality of entities agree.

11. A method of data synchronization, comprising:
dividing, by at least one computer, data-writing operations into batches, the batches corresponding to different time segments, by obtaining real-time agreement among a plurality of automated agents that are at least partially autonomous regarding boundaries between the batches, wherein obtaining the real-time agreement comprises sending requests proposing respective boundaries, and receiving responses from at least some of the automated agents regarding whether or not the at least some of the automated agents agree with the proposed boundaries; and
transmitting, by the at least one computer, a plurality of the data-writing operations, together with an indication of boundaries between the batches, to a remote data-storage location.

12. A method according to claim 11, wherein the at least one computer includes plural computers, and wherein the automated agents comprise different ones of the plural computers.

13. A method according to claim 11, wherein the automated agents comprise different data-storage device controllers.

14. A method according to claim 11, wherein the automated agents comprise at least one of: different application programs and different portions of a single application program.

15. A method according to claim 11, wherein in response to one of the requests, the at least some of the automated agents respond by proposing a boundary different from the boundary proposed by the one request.

16. A method according to claim 11, further comprising determining that a same data block was written in an earlier first data-writing operation and in a later second data-writing operation within a same batch and, in response, suppressing transmission of the first data-writing operation.

17. A method according to claim 11, wherein data-writing operations for earlier batches are transmitted before data-writing operations for later batches.

18. A non-transitory computer-readable storage medium storing computer-executable process steps for data synchronization, said process steps comprising:
   dividing data-writing operations, made across a plurality of logical storage units on different data-storage devices, into batches, the batches corresponding to different time segments; and
   transmitting a plurality of the data-writing operations, together with an indication of boundaries between the batches, to a remote data-storage location,
   wherein a particular one of the boundaries between the batches is determined by at least one of: (1) identifying a period of time of sufficient duration during which no data-writing operations were performed and declaring a point during said period of time as the particular boundary, wherein identifying the period of time having the sufficient duration is to accommodate a maximum expected clock skew among a plurality of entities, and (2) obtaining agreement from the plurality of entities, wherein obtaining the agreement comprises at least some of the plurality of entities receiving a request proposing the particular boundary and the at least some of the plurality of entities responding whether or not the at least some of the plurality of entities agree with the proposed particular boundary.

19. A computer-readable medium according to claim 18, wherein the particular boundary is determined by obtaining the agreement from the plurality of entities, using a distributed agreement algorithm across the plurality of entities to obtain agreement from the entities in real-time.

20. A computer-readable medium according to claim 18, wherein in response to the request proposing the particular boundary, the at least some of the entities respond by proposing a boundary different from the particular boundary.

21. A computer-readable medium according to claim 18, wherein the plurality of entities comprise different ones of plural computers, and wherein the plural computers use different clocks, and wherein identifying the period of time having the sufficient duration comprises identifying a time gap that provides a margin to accommodate clock skew resulting from use of the different clocks.

22. A computer-readable medium according to claim 18, wherein the particular boundary is determined by:
   identifying the period of time of sufficient duration during which no data-writing operations were performed and declaring the point during said period of time as the particular boundary; and
   obtaining the agreement from the plurality of entities regarding the declared particular boundary,
   wherein the declared particular boundary is used if the plurality of entities agree.

* * * * *